US006655345B2

(12) United States Patent
Ogawa et al.

(10) Patent No.: US 6,655,345 B2
(45) Date of Patent: Dec. 2, 2003

(54) VALVE TIMING CONTROLLER, VALVE TIMING CONTROL METHOD AND ENGINE CONTROL UNIT FOR INTERNAL COMBUSTION ENGINE

(75) Inventors: Ken Ogawa, Saitama-ken (JP); Isao Komoriya, Saitama-ken (JP); Yasunori Ehara, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 17 days.

(21) Appl. No.: 09/952,679

(22) Filed: Sep. 14, 2001

(65) Prior Publication Data

US 2002/0029757 A1 Mar. 14, 2002

(30) Foreign Application Priority Data

Sep. 14, 2000 (JP) ......................................... 2000-280556

(51) Int. Cl.[7] ............................. F02B 17/00; F02B 5/00; F01L 1/34
(52) U.S. Cl. ...................... 123/295; 123/305; 123/90.15
(58) Field of Search ................................. 123/295, 305, 123/90.15–90.18

(56) References Cited

U.S. PATENT DOCUMENTS 5,347,962 A * 9/1994 Nakamura et al. ......... 123/90.16
6,311,667 B1 * 11/2001 Satou et al. ................. 123/295

* cited by examiner

Primary Examiner—Henry C. Yuen
Assistant Examiner—Arnold Castro
(74) Attorney, Agent, or Firm—Lahive & Cockfield, LLP

(57) ABSTRACT

A valve timing controller for use in a direct injection type internal combustion engine is provided for enabling a valve timing to be appropriately set in accordance with a load on the engine even in a stratified combustion mode. The internal combustion engine has a valve timing changing mechanism for changing a valve timing of at least one of an intake valve and an exhaust valve so that it is operated in a combustion mode switched between a uniform combustion mode in which a fuel is injected into a cylinder during an intake stroke and a stratified combustion mode in which a fuel is injected into a cylinder in a compression stroke. The valve timing controller comprises a required torque determining unit for determining a required torque outputted by the internal combustion engine based on the engine rotational speed and accelerator pedal opening, and a valve timing determining unit for determining the valve timing in accordance with the required torque and the engine rotational speed.

21 Claims, 9 Drawing Sheets

F I G. 1 0
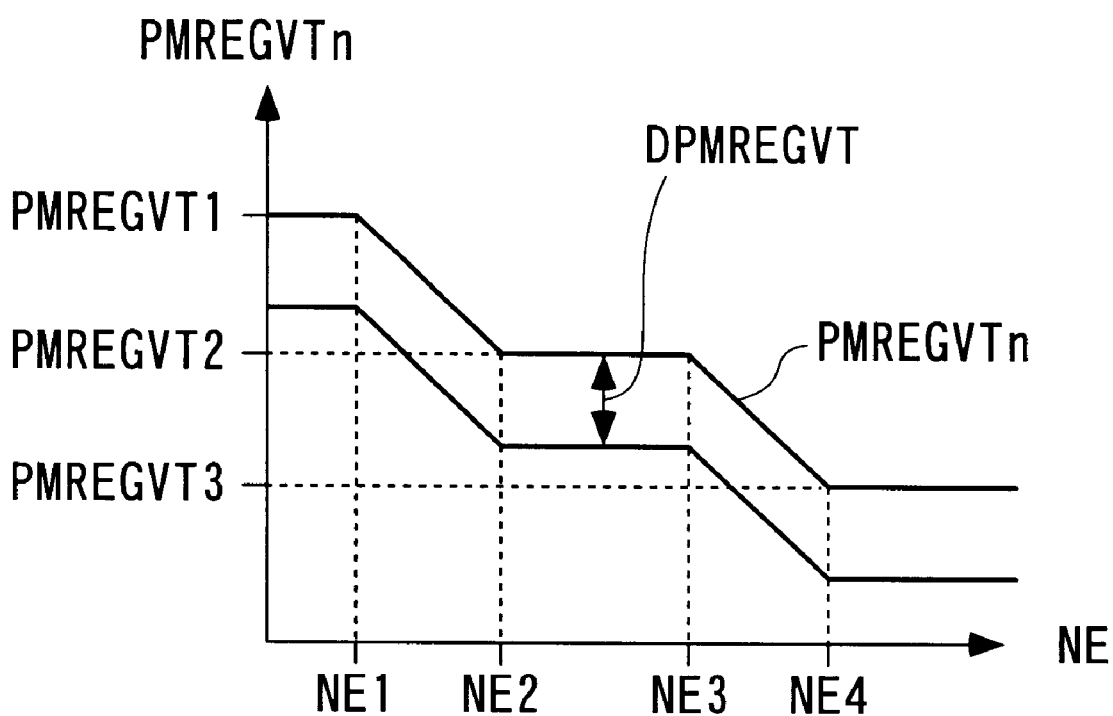

VALVE TIMING CONTROLLER, VALVE TIMING CONTROL METHOD AND ENGINE CONTROL UNIT FOR INTERNAL COMBUSTION ENGINE

BACKGROUND OF THE INVENTION

1. Field of the Invention

The present invention relates generally to a valve timing controller, a valve timing control method and an engine control unit for an internal combustion engine, and more particularly, to a valve timing controller, a valve timing control method and an engine control unit for an internal combustion engine which is equipped with a valve timing changing mechanism for changing a valve timing for at least one of an intake valve and an exhaust valve such that the engine is operated in a combustion mode switched between a uniform combustion mode in which a fuel injection is performed during an intake stroke and a stratified combustion mode in which a fuel injection is performed in a compression stroke.

2. Description of the Prior Art

A conventional valve timing controller for an internal combustion engine of the type mentioned above is known, for example, from Laid-open Japanese Patent Application No. 7-301144. An internal combustion engine described in this document comprises a cam phase changing mechanism which changes the phase of an intake cam (hereinafter referred to as the "cam phase") for a crank shaft as a valve timing changing mechanism. A change in the cam phase results in a change in valve timing of an intake valve, i.e., overlapping of the intake valve with an exhaust valve, and so on, thereby leading to a change in a filling efficiency and internal EGR. The disclosed valve timing controller sets a target cam phase in accordance with the engine rotational speed and a load represented by a throttle valve opening, so that the cam phase is controlled to reach the target cam phase, thereby achieving engine power suitable for the load of the internal combustion engine, and an improvement in the exhaust gas characteristics.

Another known valve timing controller for an internal combustion engine is described, for example, in Japanese Patent No. 2630632. The disclosed internal combustion engine comprises a cam profile switching mechanism, as a valve timing changing mechanism, which has an intake cam and an exhaust cam comprised of a lower speed cam and a higher speed cam, respectively, having different cam profiles from each other, such that the cam profile of each cam is switched between the lower speed cam and the higher speed cam. The switching of the cam profile causes a change in valve timings of the intake valve and the exhaust valve, i.e., the amount of valve lift and so on, resulting in an change in the filling efficiency. In this valve timing controller, the cam profile is switched based on the engine rotational speed and a basic fuel injection time which is calculated based on the engine rotational speed and a load represented by an intake pipe inner pressure, thereby providing engine power suitable for the load of the internal combustion engine.

Further, a recent internal engine, known as a direct injection type, directly injects a fuel into a cylinder, and is operated in a combustion mode which is switched between a uniform combustion mode and a stratified combustion mode in order to improve the fuel economy (see, for example, Laid-open Japanese Patent Application No. 11-22508). In this internal combustion engine, the stratified combustion mode is performed during an extremely low load operation such as idling, wherein a fuel injection is performed during an intake stroke with a throttle valve being substantially fully opened to supply a large amount of intake air into a cylinder for burning at an extremely leaner air/fuel ratio than the stoichiometric air/fuel ratio. On the other hand, the uniform combustion mode is performed during operations other than the extreme low load operation, wherein a fuel injection is performed during a compression stroke, and a throttle valve opening is controlled in accordance with a load represented by the engine rotational speed and an accelerator opening to control the amount of intake air for burning at a richer air/fuel ratio than the stratified combustion mode.

The foregoing cam phase changing mechanism and profile switching mechanism, though contributing to the improvement on the exhaust gas characteristics and engine power, may experience problems as follows, if they are employed in the conventional direct injection type internal combustion engine. As described above, the direct injection type internal combustion engine substantially fully opens the throttle valve during an extremely low load operation such as idling to perform the stratified combustion mode with a large amount of intake air supplied into a cylinder, so that the throttle valve opening, absolute intake pipe inner pressure, and amount of intake air become extremely large, causing the internal combustion engine to exhibit behaviors exactly opposite to those of a normal intake port injection type internal combustion engine. On the other hand, the conventional cam phase changing mechanism sets its target cam phase in accordance with the throttle valve opening as a parameter that represents the load, while the cam profile switching mechanism switches the cam profile in response to the intake pipe inner pressure that represents the load. Thus, if such a valve timing changing mechanism is simply combined in the conventional direct injection type internal combustion engine, a valve timing suitable for a load cannot be set in the stratified combustion mode, and as a result, the engine fails to ensure required engine power and internal EGR, resulting in deteriorated exhaust gas characteristics, fuel economy and operability.

OBJECT AND SUMMARY OF THE INVENTION

The present invention has been made to solve the problem as mentioned above, and its object is to provide a valve timing controller, a valve control method and an engine control unit suitable for use in a direct injection type internal combustion engine, which are capable of appropriately setting a valve timing in accordance with an engine load even in the stratified combustion mode.

To achieve the above object, according to a first aspect of the present invention, there is provided a valve timing controller for an internal combustion engine which is equipped with a valve timing changing mechanism for changing a valve timing of at least one of an intake valve and an exhaust valve so that the engine is operated in a combustion mode switched between a uniform combustion mode in which a fuel is injected into a cylinder during an intake stroke and a stratified combustion mode in which a fuel is injected into a cylinder in a compression stroke.

The valve timing controller according to the first aspect is characterized by comprising engine rotational speed detecting means for detecting a rotational speed of the internal combustion engine; accelerator pedal opening detecting means for detecting an opening of an accelerator pedal; required torque determining means for determining a required torque outputted by the internal combustion engine based on the detected engine rotational speed and accelerator pedal opening; and valve timing determining means for determining the valve timing in accordance with the determined required torque and the engine rotational speed.

The internal combustion engine is operated in the combustion mode which is switched between the uniform combustion mode in which a fuel is injected into a cylinder in an intake stroke and the stratified combustion mode in which the fuel is injected in a compression stroke. Also, according to the valve timing controller in the first aspect of the present invention, a required torque outputted by the internal combustion engine is determined based on the detected engine rotational speed and accelerator pedal opening, and a valve timing for the intake valve and/or the exhaust valve is determined in accordance with the determined required torque and engine rotational speed. In this way, the valve timing is determined in accordance with the required torque and engine rotational speed, while the required torque is determined as a torque which should be outputted by the internal combustion engine, based on the engine rotational speed and the accelerator pedal opening which represents a load on the engine. It is therefore possible to set the valve timing in accordance with the required torque, i.e., the load, and to appropriately set the valve timing in accordance with the load without affected by the throttle valve opening, intake pipe inner pressure, amount of intake air, and so on, even in the stratified combustion mode. As a result, the filling efficiency can be appropriately controlled to ensure required engine power.

To achieve the above object, according to a second aspect of the present invention, there is provided a valve timing controller for an internal combustion engine having a valve timing changing mechanism for changing a valve timing of at least one of an intake valve and an exhaust valve so that the engine is operated in a combustion mode switched between a uniform combustion mode in which a fuel is injected into a cylinder during an intake stroke and a stratified combustion mode in which a fuel is injected into a cylinder in a compression stroke.

The valve timing controller according to the second aspect of the present invention is characterized by comprising an engine rotational speed detecting module for detecting a rotational speed of the internal combustion engine; an accelerator pedal opening detecting module for detecting an opening of an accelerator pedal; a required torque determining module for determining a required torque outputted by the internal combustion engine based on the detected engine rotational speed and accelerator pedal opening; and a valve timing determining module for determining the valve timing in accordance with the determined required torque and the engine rotational speed.

This valve timing controller provides the same advantageous effects as described above concerning the valve timing controller according to the first aspect of the present invention.

To achieve the above object, according to a third aspect of the present invention, there is provided a valve timing control method for an internal combustion engine having a valve timing changing mechanism for changing a valve timing of at least one of an intake valve and an exhaust valve so that the engine is operated in a combustion mode switched between a uniform combustion mode in which a fuel is injected into a cylinder during an intake stroke and a stratified combustion mode in which a fuel is injected into a cylinder in a compression stroke.

The valve timing control method according to the third aspect of the present invention is characterized by comprising the steps of detecting a rotational speed of the internal combustion engine; detecting an opening of an accelerator pedal; determining a required torque outputted by the internal combustion engine based on the detected engine rotational speed and accelerator pedal opening; and determining the valve timing in accordance with the determined required torque and the engine rotational speed.

This control method provides the same advantageous effects as described above concerning the valve timing controller according to the first aspect of the present invention.

To achieve the above object, according to a fourth aspect of the present invention, there is provided an engine control unit including a control program for causing a computer to carry out control of valve timing for an internal combustion engine having a valve timing changing mechanism for changing a valve timing of at least one of an intake valve and an exhaust valve so that the engine is operated in a combustion mode switched between a uniform combustion mode in which a fuel is injected into a cylinder during an intake stroke and a stratified combustion mode in which a fuel is injected into a cylinder in a compression stroke.

The engine control unit according to the fourth aspect of the present invention is characterized in that the control program causes the computer to detect a rotational speed of the internal combustion engine; detect an opening of an accelerator pedal; determine a required torque outputted by the internal combustion engine based on the detected engine rotational speed and accelerator pedal opening; and determine the valve timing in accordance with the determined required torque and the engine rotational speed.

This engine control unit provides the same advantageous effects as described above concerning the valve timing controller according to the first aspect of the present invention.

In the valve timing controller, preferably, the valve timing changing mechanism includes a cam phase changing mechanism for changing a cam phase, with respect to a crank shaft, of at least one of an intake cam for opening and closing the intake valve and an exhaust cam for opening and closing the exhaust valve; and the valve timing determining means includes target cam phase determining means for determining a target cam phase for the cam phase in accordance with the required torque and the engine rotational speed.

With the configuration described above, the target cam phase for the intake cam and/or the exhaust cam is determined in accordance with the required torque and engine rotational speed, and the actual cam phase is variably controlled aiming at the target cam phase, so that the cam phase can be appropriately controlled in accordance with the load to appropriately control the filling efficiency and inner EGR, thereby making it possible to ensure required engine power and improve the exhaust gas characteristics.

Also, in the valve timing controller, preferably, the valve timing changing mechanism includes a cam phase changing mechanism for changing a cam phase, with respect to a crank shaft, of at least one of an intake cam for opening and closing the intake valve and an exhaust cam for opening and closing the exhaust valve, and the valve timing determining module includes a target cam phase determining module for determining a target cam phase for the cam phase in accordance with the required torque and the engine rotational speed.

This preferred embodiment of the valve timing controller provides the same advantageous effects as provided by the corresponding preferred embodiment of the valve timing controller.

Also, in the valve timing control method for an internal combustion engine, preferably, the valve timing changing mechanism includes a cam phase changing mechanism for changing a cam phase, with respect to a crank shaft, of at least one of an intake cam for opening and closing the intake valve and an exhaust cam for opening and closing the exhaust valve, wherein the step of changing a valve timing includes changing a cam phase, with respect to a crank shaft, of at least one of an intake cam for opening and closing the intake valve and an exhaust cam for opening and closing the exhaust valve, and the step of determining the valve includes determining a target cam phase for the cam phase in accordance with the required torque and the engine rotational speed.

This preferred embodiment of the control method provides the same advantageous effects as provided by the corresponding preferred embodiment of the valve timing controller.

Also, in the engine control unit, preferably, the valve timing changing mechanism includes a cam phase changing mechanism for changing a cam phase, with respect to a crank shaft, of at least one of an intake cam for opening and closing the intake valve and an exhaust cam for opening and closing the exhaust valve, and when the control program causes the computer to determine the valve timing, the control program causes the computer to determine a target cam phase for the cam phase in accordance with the required torque and the engine rotational speed.

This preferred embodiment of the engine control unit provides the same advantageous effects as provided by the corresponding preferred embodiment of the valve timing controller.

Preferably, in the valve timing controller, the valve timing changing mechanism includes a cam profile switching mechanism for switching at least one of an intake cam for opening and closing the intake valve and an exhaust cam for opening and closing the exhaust valve to one of a plurality of cams having different cam profiles from each other; and the valve timing determining means includes cam profile switching means for switching the cam profile in accordance with the required torque and the engine rotational speed.

With the configuration described above, since the cam profile for the intake cam and/or the exhaust cam is switched in accordance with the required torque and engine rotational speed, the cam profile can be appropriately switched in accordance with the load, thereby making it possible to ensure required engine power.

Preferably, in the valve timing controller, the valve timing changing mechanism includes a cam profile switching mechanism for switching at least one of an intake cam for opening and closing the intake valve and an exhaust cam for opening and closing the exhaust valve to one of a plurality of cams having different cam profiles from each other; and the valve timing determining module includes a cam profile switching module for switching the cam profile in accordance with the required torque and the engine rotational speed.

This preferred embodiment of the valve timing controller provides the same advantageous effects as provided by the corresponding preferred embodiment of the valve timing controller.

Preferably, in the valve timing control method for an internal combustion engine, the valve timing changing mechanism includes a cam profile switching mechanism for switching at least one of an intake cam for opening and closing the intake valve and an exhaust cam for opening and closing the exhaust valve to one of a plurality of cams having different cam profiles from each other, and the step of determining the valve timing includes switching the cam profile in accordance with the required torque and the engine rotational speed.

This preferred embodiment of the control method provides the same advantageous effects as provided by the corresponding preferred embodiment of the valve timing controller.

Preferably, in the engine control unit, the valve timing changing mechanism includes a cam profile switching mechanism for switching at least one of an intake cam for opening and closing the intake valve and an exhaust cam for opening and closing the exhaust valve to one of a plurality of cams having different cam profiles from each other, and when the control program causes the computer to determine the valve timing, the control program causes the computer to switch the cam profile in accordance with the required torque and the engine rotational speed.

This preferred embodiment of the engine control unit provides the same advantageous effects as provided by the corresponding preferred embodiment of the valve timing controller.

Preferably, the valve timing controller further includes at least one of engine temperature detecting means for detecting the temperature of the internal combustion engine and vehicle speed detecting means for detecting the speed of a vehicle which carries the internal combustion engine, and valve timing correcting means for correcting the valve timing in accordance with at least one of the detected engine temperature and vehicle speed.

As the temperature or the vehicle speed of the internal combustion engine changes, the effective filling efficient varies due to a change in the density of intake air or the like. Therefore, according to the present invention, the valve timing is corrected by the temperature and/or vehicle speed of the internal combustion engine to compensate for a deviation of the filling efficiency, thereby making it possible to provide more proper engine power.

Preferably, the valve timing controller further includes at least one of an engine temperature detecting module for detecting the temperature of the internal combustion engine and a vehicle speed detecting module for detecting the speed of a vehicle which carries the internal combustion engine, and a valve timing correcting module for correcting the valve timing in accordance with at least one of the detected engine temperature and vehicle speed.

This preferred embodiment of the valve timing controller provides the same advantageous effects as provided by the corresponding preferred embodiment of the valve timing controller.

Preferably, the valve timing control method further includes the steps of detecting at least one of a temperature of the internal combustion engine and a speed of a vehicle equipped with the internal combustion engine; and correcting the valve timing in accordance with at least one of the detected engine temperature and vehicle speed.

This preferred embodiment of the control method provides the same advantageous effects as provided by the corresponding preferred embodiment of the valve timing controller.

Preferably, in the engine control unit, the control program further causes the computer to detect at least one of a temperature of the internal combustion engine and a speed of a vehicle equipped with the internal combustion engine;

and to correct the valve timing in accordance with at least one of the detected engine temperature and vehicle speed.

This preferred embodiment of the engine control unit provides the same advantageous effects as provided by the corresponding preferred embodiment of the valve timing controller.

Preferably, the internal combustion engine further includes a fuel injection valve for injecting the fuel which is disposed in a central portion of a top wall of a combustion chamber of the cylinder for injecting the fuel toward a recess formed in a piston. According to this preferred embodiment, the advantageous effects provided by the valve timing controller, the valve timing control method and the engine control unit according to the first through fourth aspects of the present invention and their preferred embodiments described above can be obtained in an optimized manner.

BRIEF DESCRIPTION OF THE DRAWINGS

FIG. 10 shows an example of a required torque threshold value table used in the subroutine of FIG. 9.

DETAILED DESCRIPTION OF THE EMBODIMENT

Figure 1:
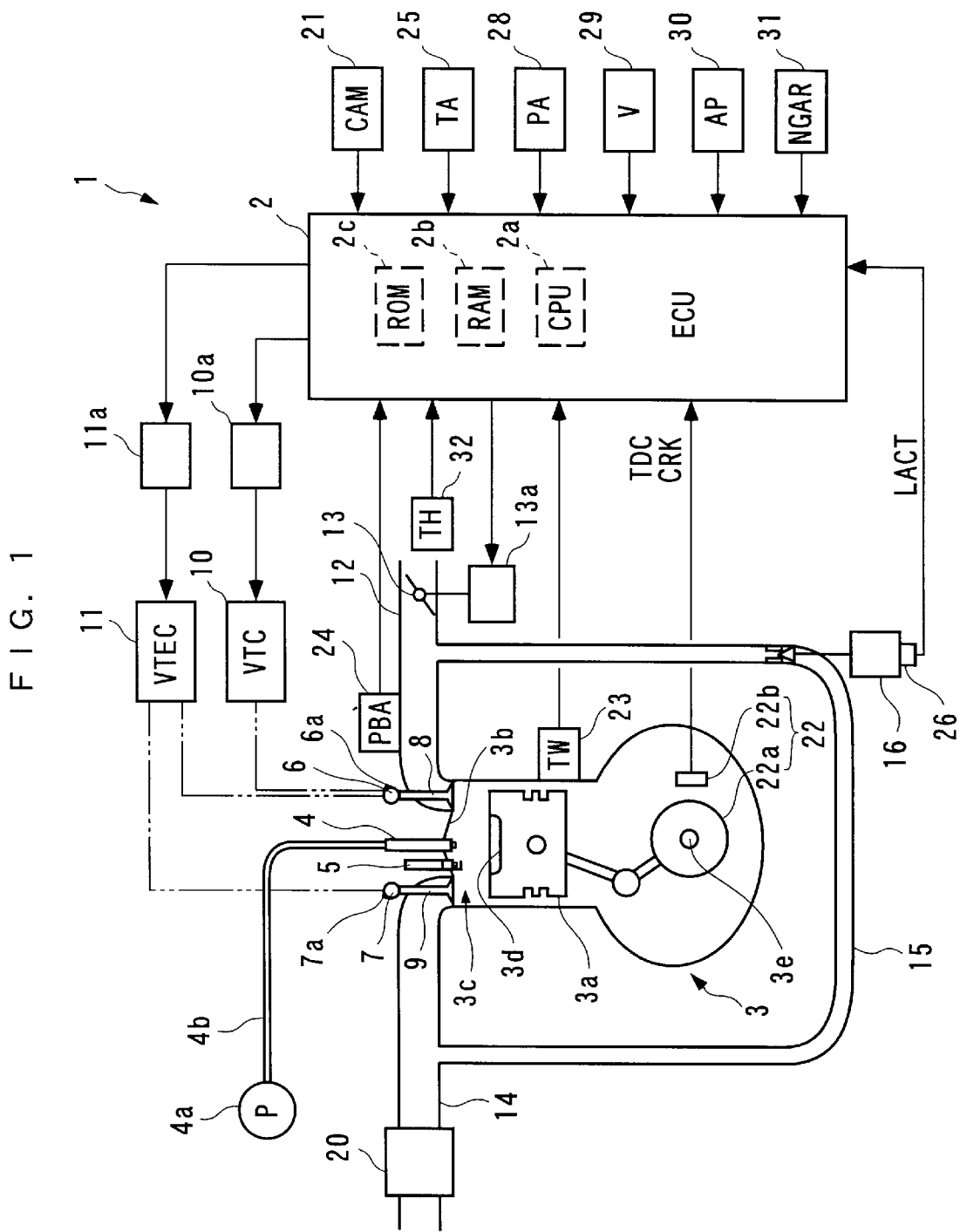
FIG. 1 is a block diagram generally illustrating the configuration of a valve timing controller for an internal combustion engine according to one embodiment of the present invention.

In the following, a valve timing controller for an internal combustion engine according to one embodiment of the present invention will be described with reference to the accompanying drawings. FIG. 1 generally illustrates the configuration of the valve timing controller according to this embodiment and an internal combustion engine in which the valve timing controller is applied.

The internal combustion engine (hereinafter referred to as the "engine") 3 is a straight four-cylinder DOHC type gasoline engine (only one cylinder is shown) which is equipped in a vehicle, not shown. A combustion chamber 3c is formed between a piston 3a and a cylinder head 3b of each cylinder, and a recess 3d is formed in a central portion of the top surface of the piston 3a. The combustion chamber 3c is provided with a fuel injection valve (hereinafter referred to as the "injector") 4 and an ignition plug 5. The injector 4 is directed to the recess 3d. Thus, the engine 3 is of a direct injection type which directly injects a fuel into the combustion chamber 3c.

The injector 4 is disposed in a central portion of the top wall of the combustion chamber 3c. The fuel is pumped by a fuel pump 4b through a fuel pipe 4a, and regulated at a predetermined pressure by a regulator (not shown), before it is supplied to the injector 4. With the foregoing configuration, the fuel is injected from the injector 4 toward the recess 3d of the piston 3a, strikes the recess 3d to form a fuel jet stream, or diffused in the combustion chamber 3c. A fuel injection period Tout and a fuel injection time θinj of the injector 4 are controlled by driving signal from an electric control unit (ECU) 2, later described.

The ignition plug 5 is applied with a high voltage by a driving signal from the ECU 2 at a timing in accordance with a ignition time IG, and then shut off to discharge, causing an air-fuel mixture to burn in the combustion chamber 3c.

An intake cam shaft 6 and an exhaust cam shaft 7 of the engine 3 are provided with a plurality of intake cams 6a and exhaust cam 7a (one each only is shown in FIG. 1) integrated therewith for opening and closing intake valves 8 and exhaust valves 9 associated therewith. The intake cam shaft 6 and the exhaust cam shaft 7 are coupled to a crank shaft 3e through driven sprockets and timing chains (neither of which are shown in FIG. 1) associated therewith, such that they are driven by the crank shaft 3e to rotate once as the crank shaft 3e rotates twice. The intake cam shaft 6 is rotatably coupled to its driven sprocket over a predetermined angular distance, so that the phase VTCACT of the intake cam 6a (hereinafter simply referred to as the "cam phase") with respect to the crank shaft 3e is changed by changing a relative angle to the driven sprocket.

The intake cam shaft 6 is provided at one end thereof with a cam phase changing mechanism (hereinafter abbreviated as "VTC") 10 and a VTC electromagnetic control valve 10a for controlling the cam phase VTCACT. The VCT 10 continuously advances or retards the cam phase VTCACT to advance or retard an open/close timing for the intake valve 8. This causes valve overlapping between the intake valve 8 and the exhaust valve 9 to increase or decrease, resulting in an increase or a decrease in the internal EGR and a change in the filling efficiency. The operation of the VTC 10 is controlled by controlling the position of a spool valve (not shown) of the VTC electromagnetic control valve 10a by a duty ratio DbVTC of a driving signal from the ECU 2 to thereby change a hydraulic pressure supplied to the VCT 10. Specifically, the cam phase VTCACT is controlled to advance more as the duty ratio DbVTC is larger. When the VTC 10 is stopped, the duty ratio DbTV is set to zero so that the cam phase VTCACT is held at the most retard position.

A cam angle sensor 21 is disposed at the end of the intake cam shaft 6 opposite to the cam phase changing mechanism 8. The cam angle sensor 21, which is comprised, for example, of a magnet rotor and an MRE pickup, outputs a CAM signal, which is a pulse signal, every predetermined cam angle (for example, every 1°) to the ECU 2, as the intake cam shaft 6 is rotated. The ECU 2 calculates the actual cam phase VTCACT with this CAM signal and a CRK signal, later described.

Further, though not shown, each of the intake cam 6a and the exhaust cam 7a is comprised of a lower speed cam and a higher speed cam which has a higher cam profile than the lower speed cam. These lower speed cam and higher speed cam are switched by their respective cam profile switching mechanisms (hereinafter abbreviated as "VTEC") 11, thereby switching the valve timing of the intake valve 8 and the exhaust valve 9 from a lower speed valve timing (hereinafter abbreviated as "LO.VT") to a higher speed valve timing (hereinafter abbreviated as "HI.VT"), and vice versa. With HI.VT, the intake valve 8 and the exhaust valve 9 are opened for a longer period, valve overlapping of both becomes longer, and the amount of valve lift becomes larger, thereby increasing the filling efficiency. Like the VTC 10, the operation of the VTEC 11 is also controlled by controlling the VTEC electromagnetic control valve 11a by a driving signal from the ECU 2 to change a hydraulic pressure supplied to the VTEC 11.

The valve timing for the intake valve 8 and the exhaust valve 9 is set to LO.VT for lean combustion among other uniform combustion, stratified combustion and two-time injection combustion, later described, and switched to LO.VT or HI.VT for stoichiometric combustion and rich combustion among other uniform combustion.

A magnet rotor 22a is attached on the crank shaft 3e. The magnet rotor 22a comprises a crank angle sensor 22 together with the MRE pickup 22b. The crank angle sensor 22 (engine rotational speed detecting means) outputs a CRK signal and a TDC signal, which are pulse signals, as the crank shaft 3e is rotated.

One pulse of the CRK signal is outputted every predetermined crank angle (for example, every 30°). The ECU 2 calculates the engine rotational speed NE of the engine 3 (hereinafter referred to as the "engine rotational speed") based on the CRK signal. The TDC signal indicates that the piston 3a of each cylinder is at a predetermined crank angle position near TDC (top dead center) at the start of an intake stroke. In this embodiment implemented in a four-cylinder engine, one pulse is outputted each time the crank angle advances over 180°. The engine 3 is also provided with a cylinder discriminating sensor, not shown, which sends to the ECU 2 a cylinder discriminating signal which is a pulse signal for discriminating a cylinder. The ECU 2 determines the crank angle position of each cylinder with these cylinder discriminating signal, CRK signal and TDC signal.

An engine water temperature sensor 23 (engine temperature sensing means) is attached to the body of the engine 3. The engine water temperature 23, which may be comprised of a thermistor, detects an engine water temperature TW that indicates the temperature of cooling water circulating in the body of the engine 3, and sends a signal indicative of the detected engine water temperature TW to the ECU 2.

A throttle vale 13 is disposed in the intake pipe 12 of the engine 3. The throttle valve 13 is driven by an electrically driven motor 13a coupled thereto, so that its opening (throttle valve opening) TH is controlled. The throttle opening TH is detected by a throttle valve opening sensor 32 which sends to the ECU 2 a signal indicative of the detected throttle opening TH. The ECU 2 controls the throttle valve opening TH through the electric motor 13a in accordance with an operating state of the engine 3 to control the amount of intake air to the engine 3.

An absolute intake pipe inner pressure sensor 24 is disposed at a location of the intake pipe 12 downstream of the throttle valve 13. The absolute intake pipe inner pressure sensor 24, which may be comprised of a semiconductor pressure sensor or the like, detects an absolute intake pipe inner pressure PBA, which is the absolute pressure within the intake pipe 12, and sends to the ECU 2 a signal indicative of the detected absolute intake pipe inner pressure PBA. Also, an intake air temperature 25, which may be comprised of a thermistor or the like, is attached to the intake pipe 12 for detecting an intake air temperature TA within the intake pipe 12, and sending to the ECU 2 a signal indicative of the detected intake air temperature TA.

An EGR pipe 15 for EGR is connected between a location of the intake pipe 12 downstream of the throttle valve 13 and a location of the exhaust pipe 14 upstream of a three-way catalyst 20. An EGR control valve 16 is attached to the EGR pipe 15. The EGR control valve 16, which may be comprised of a linear electromagnetic valve, has its valve lift amount LACT linearly changed by a driving signal from the ECU 2 to control the EGR amount. The valve lift amount LACT is detected by a valve lift amount sensor 26 which sends to the ECU 2 a signal indicative of the detected valve lift amount LACT.

The ECU 2 is further supplied with a signal indicative of a detected atmospheric pressure PA from an atmospheric pressure sensor 28; a signal indicative of a detected vehicle speed (V) from a vehicle speed sensor 29 (vehicle speed detecting means); a signal indicative of a detected accelerator pedal opening AP, which is an operation amount of an accelerator pedal (not shown) from an accelerator pedal opening sensor 30 (accelerator pedal opening detecting means); and a signal indicative of a detected gear stage NGAR of an automatic transmission (not shown) of the engine 3, from a gear stage sensor 31.

In this embodiment, the ECU 2 comprises engine rotational speed detecting means, required torque determining means, valve timing determining means, target cam phase determining means, cam profile switching means, and valve timing correcting means. The ECU 2 is comprised of a microcomputer which includes a CPU 2a, a RAM 2b, a ROM 2c and an input/output interface (not shown). The detected signals from the aforementioned sensors 20–32 are A/D converted and reshaped in the input interface before they are inputted to the CPU 2a. The CPU 2a, in response to these input signals, executes a variety of operational processing based a control program stored in the ROM 2c, a variety of tables and maps, later described, and flag values, later described, temporarily stored in the RAM 2b, and so on.

Specifically, the CPU 2a determines an operating state of the engine 3 from the variety of detected signals, and also determines a required torque PMCMD outputted by the engine 3 based on the engine rotational speed NE and the accelerator pedal opening AP. Also, the CPU 2a sets the combustion mode of the engine 3 to the stratified combustion mode during an extremely low load operation such as idling and to the uniform combustion mode during an operation other than the extremely low load operation in accordance with the determined required torque PMCMD, engine rotational speed NE and so on, and executes a double injection combustion mode at a transition between the two combustion modes. In addition, the CPU 2a determines optimal engine control parameters such as the fuel injection period Tout, fuel injection time θinj and ignition time IG for each determined combustion mode.

In the stratified combustion mode of the two combustion modes, the throttle valve 13 is controlled to remain in a substantially full open state, while a fuel is injected from the injector 4 into the combustion chamber 3c during a compression stroke, with a majority of the injected fuel striking the recess 3d to form a fuel jet stream. An air/fuel mixture is generated from this fuel jet stream and an intake air flow from the intake pipe 12. With the piston 3a positioned near the top dead center in the compression stroke, the fuel is burnt in an extremely leaner air/fuel ratio A/F (for example, in a range of 27 to 60) than the stoichiometric air/fuel ratio while the air/fuel mixture is distributed dominantly near the ignition plug 5.

In the uniform combustion mode, on the other hand, the throttle valve opening TH is controlled to an opening in accordance with the required torque PMCMD, the engine rotational speed NE and so on, and the fuel is injected into the combustion chamber 3c during an intake stroke. This causes combustion to be performed in a richer air/fuel ratio A/F (for example, in a range of 12 to 22) than in the stratified combustion mode with an air/fuel mixture produced from a fuel jet stream and an air flow uniformly distributed in the combustion chamber 3c.

Further, in the double injection combustion mode, the fuel is injected in an intake stroke and a compression stroke, respectively, of one combustion cycle, to perform combustion in a transient air/fuel ratio A/F (for example, in a range of 14.7 to 30) state.

The ECU 2 further conducts control for the VTC 10 and VTEC 11 (hereinafter referred to as the "VTC control" and "VTEC control," respectively) in accordance with the required torque PMCMD and the engine rotational speed NE in the following manner.

Figure 2:
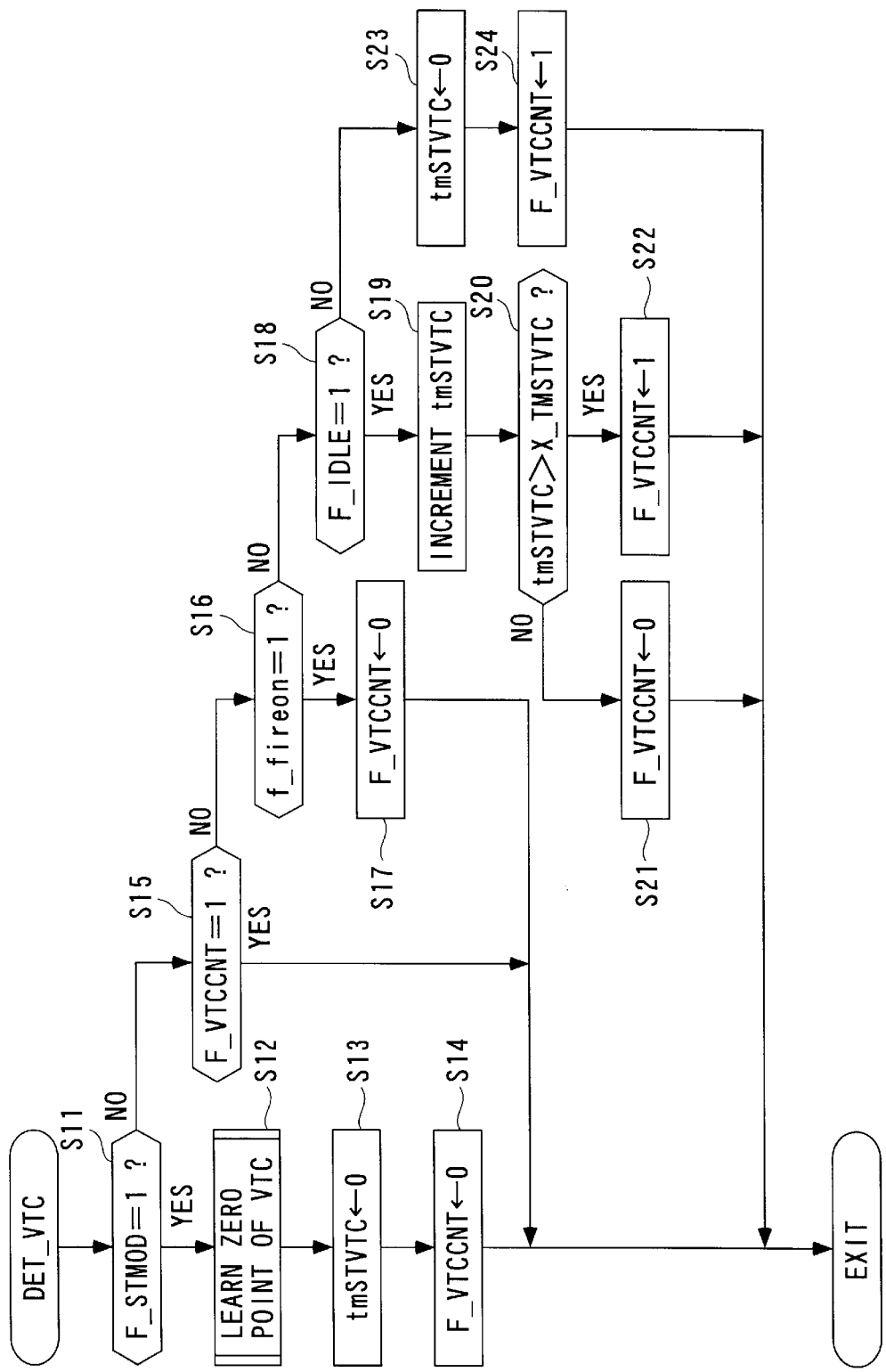
FIG. 2 is a flow chart illustrating a subroutine for determining a VTC control execution condition, executed by a controller in FIG. 1.

FIG. 2 illustrates a subroutine for determining execution condition in the VTC control. This determination and the VTC control, later described, are executed every predetermined time (for example, every 10 ms).

In the illustrated subroutine, the ECU 2 first determines at step 11 (in the figure, labeled as "S11." This abbreviation is applied similarly in the following steps) whether or not a start mode flag F_STMOD is "1." If the answer is YES, i.e., when the engine 3 is in a start mode, the ECU 2 executes zero-point learning for the VTC 10 (step 12). This zero-point learning is performed to calculate the output of the cam angle sensor 21 when the cam phase VTCACT is held at the most retard position, while the VTC 10 is inoperative, for learning that output as a zero point in order to correct a deviation of the output from the cam angle sensor 21 for calculating the actual cam phase VTCACT. Next, the ECU 2 resets a timer value tmSTVTC of a post-start disable timer T, which is an up count timer, to zero (step 13), and sets a VTC control flag F_VTCCNT to "0" on the assumption that a condition for executing the VTC control is not satisfied, followed by termination of this subroutine.

On the other hand, if the answer at step 11 is NO, i.e., when the engine 3 has departed from the start mode, the ECU 2 determines whether or not the VTC control flag F_VTCCNT is "1" (step 15). The program is terminated without further processing if the answer is YES, while the ECU 2 determines whether or not a catalyst heating mode flag f_fireon is "1" (step 16) if the answer is NO. The catalyst heating mode flag f_fireon is set to "1" when it is determined that the engine 3 is in a catalyst heating mode for rapidly activating the three-way catalyst 20. Therefore, if the answer at step 16 is YES, the ECU 2 sets the VTC control flag F_VTCCNT to "1" for controlling the cam phase VTCACT to the most retard position in order to raise a combustion temperature of the engine 3 as high as possible (step 17), to thereby disable the VTC control, followed by termination of this subroutine.

If the answer at step 16 is NO, i.e., when the engine 3 is not in the catalyst heating mode, the ECU 2 determines whether or not an idle flag F_IDLE is "1" (step 18). If the answer at step 18 is YES, i.e., when the engine 3 is idling, the ECU 2 increments the timer value tmSTVTC of the post-start disable timer (step 19), and then determines whether or not the resulting timer value tmSTVTC is larger than a predetermined value X-TMSTVTC (for example, corresponding to _seconds) (step 20). If the answer at step 20 is NO, i.e., when a predetermined time has not been elapsed after the engine 3 transitioned from the start mode to an idling operation, the ECU 2 sets the VTC control flag F_VTCCNT to "0" (step 21) to continuously disable the VTC control. In the foregoing manner, the VTC control is disabled since the hydraulic pressure of working oil for the VTC 10 is instable for the predetermined time during a starting operation of the engine 3 and after a transition of the engine 3 to an idling operation. On the other hand, if the answer at step 20 is YES, i.e., when the predetermined time has been elapsed after a transition to an idling operation, the ECU 2 sets the VTC control flag F_VTCCNT to "1" on the assumption that the condition for executing the VTC control has been satisfied (step 22), followed by termination of this subroutine.

On the other hand, if the answer at step 18 is NO, i.e., when the engine 3 has departed from the idling state, the ECU 2 resets the timer value tmSTVTC of the post-start disable timer T to "0" (step 23), and sets the VTC control flag F_VTCCNT to "1" on the assumption that the condition for executing the VTC control has been satisfied (step 24), followed by termination of this subroutine. After the VTC control flag F_VTCCNT is set to "1" in this way, the VTC control is continuously executed because the answer at step 15 ends in YES.

Figure 3:
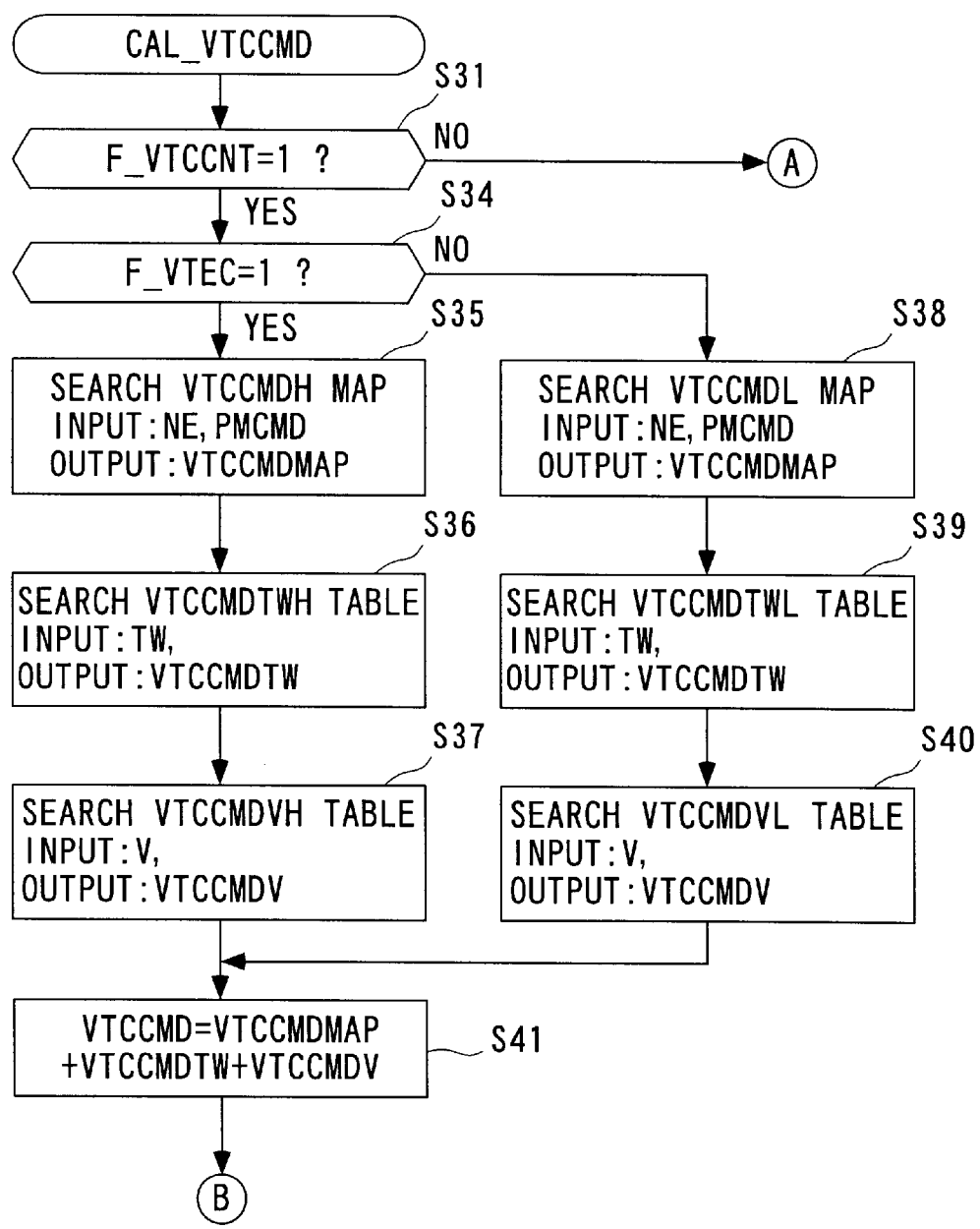
FIGS. 3 and 4 are flow charts illustrating in combination a subroutine of processing involved in VTC control.
Figure 4:
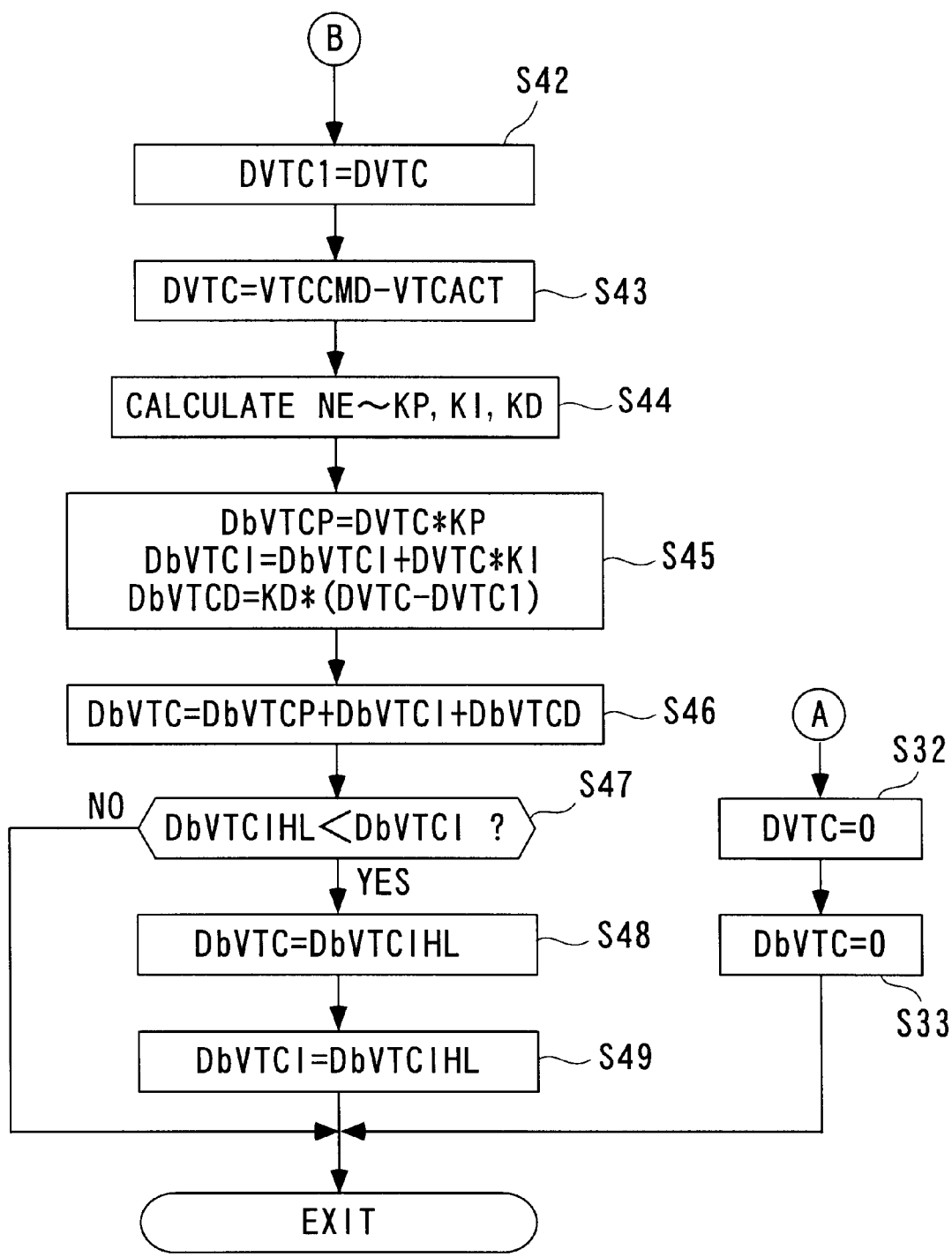

FIGS. 3 and 4 illustrate a subroutine of the processing involved in the VTC control which is executed in accordance with the result of determination for the execution condition in FIG. 2. Generally, in the illustrated subroutine, the ECU 2 determines a target cam phase VTCCMD in accordance with the required torque PMCMD and the engine rotational speed NE, and controls the duty ratio DbVTC of a driving signal outputted to the VTC electromagnetic control valve 10a in a PID feedback form such that a detected actual cam phase VTCACT reaches the target cam phase VTCCMD.

First at step 31, the ECU 2 determines whether or not the VTC control flag F_VTCCNT is "0." If the answer at step 31 is NO, i.e., when the VTC control execution condition is not satisfied, the ECU 2 sets a cam phase deviation DVTC, later described, and the duty ratio DbVTC to "0," respectively, (steps 32, 33), followed by termination of this subroutine. In this way, the ECU 2 sets the duty ratio DbVTC to "0" when the VTC control execution condition is not satisfied to disable the actuation of the VTC electromagnetic control valve 10a, with the cam phase held at the most retard position.

If the answer at step 31 is YES, i.e., when the VTC control execution condition has been satisfied, the ECU 2 determines whether or not the VTEC execution flag F_VTEC is "1" (step 34). As described later, the VTEC execution flag F_VTEC is set to "1" when the valve timing is set to HI.VT by the VTEC 11 and to "0" when set to LO.VT, respectively. If the answer at step 34 is YES, the subroutine proceeds to step 35, where the ECU 2 searches a VTCCMDH map for HI.VT in accordance with the engine rotational speed NE and the requested torque PMCMD to find a basic value VTCCMDMAP for a target cam phase.

Figure 5:
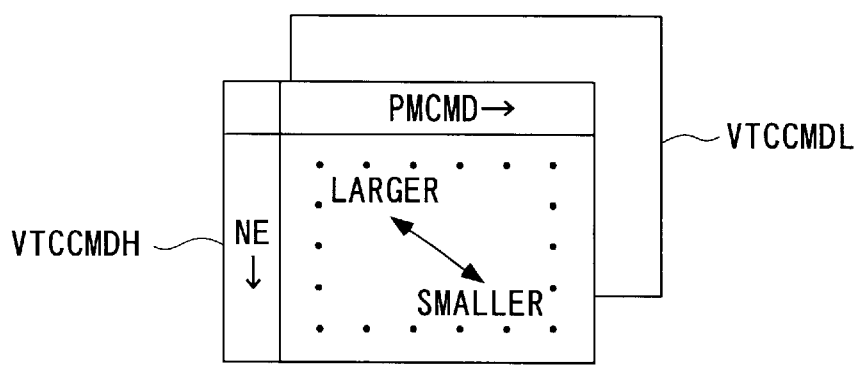
FIG. 5 shows an example of a basic value map for a target cam phase used in the subroutine of FIG. 3.

FIG. 5 shows an example of the VTCCMDH map, wherein the basic value VTCCMDMAP of the target cam phase is set at a smaller value, i.e., toward the retard side as the engine rotational speed NE is higher or the requested torque PMCMD is larger. This is because higher engine power is ensured by setting the target cam phase VTCCMD toward the retard side as the power required to the engine 3 is larger.

Figure 6:
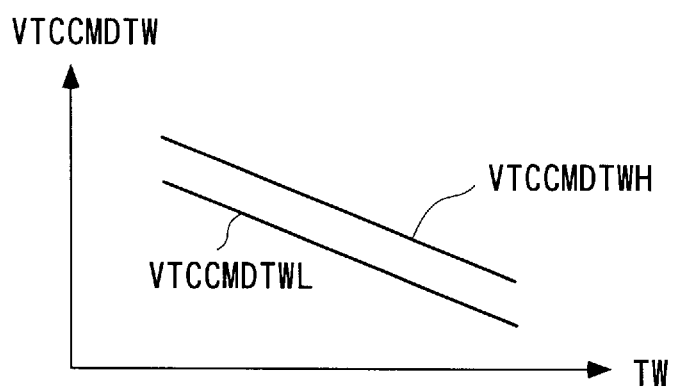
FIG. 6 shows an example of a water temperature correcting value table used in the subroutine of FIG. 3.

Next, the subroutine proceeds to step 36, where the ECU 2 searches a VTCCMDTWH table for HI.VT in accordance with an engine water temperature TW to find a water temperature correcting value VTCCMDTW for the target cam phase. FIG. 6 shows an example of the VTCCMDTWH table, wherein the water temperature correcting value VTCCMDTW is linearly set to a smaller value as the engine water temperature TW is higher. This is because a higher engine temperature results in a lower effective filling efficiency due to a lower density of intake air so that the target cam phase VTCCMD is corrected toward the retard side to compensate for the lower filling efficiency in order to ensure the engine power.

Figure 7:
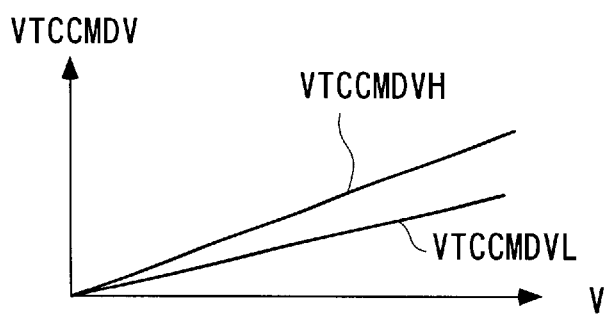
FIG. 7 shows an example of a vehicle speed correcting value table used in the subroutine of FIG. 3.

Next, the subroutine proceeds to step 37, wherein the ECU 2 searches a VTCCMDVH table for HI.VT in accordance with the engine rotational speed V to find a vehicle speed correcting vale VTCCMDV for the target cam phase. FIG. 7 shows an example of the VTCCMDVH table, wherein the vehicle speed correcting value VTCCMDVT is linearly set to a larger value as the vehicle speed V is higher. This is because a higher vehicle speed causes an increase in the filling efficiency for the intake air, so that the target cam phase VTCCMD is corrected toward the advance side to compensate for the increased filling efficiency in order to provide proper engine power.

On the other hand, if the answer at step 34 is NO, i.e., when the valve timing is set to LO.VT, the ECU 2 searches a VTCCMDL map, a VTCCMDTWL table and a VTCCMDVL table for LO.VT at steps 38–40, similarly to the aforementioned steps 35–37, to find a basic value VTCCMDMAP for a target cam phase, a water temperature correcting value VTCCMDTW, and a vehicle speed correcting value VTCCMDV, respectively. Examples of these maps and tables are shown in FIGS. 5 through 7, wherein the basic value VTCCMDMAP, water temperature correcting value VTCCMDTW and vehicle speed correcting value VTCCMDV are set to have the same tendency for the respective parameters as the correspondents for HI.VT. However, these values for LO.VT are set at smaller values than those for HI.VT. This is because the filling efficiency is inherently low during LO.VT than during HI.VT, so that the set amounts and correcting amounts are adapted therefor.

Next, at step 41 subsequent to step 37 or 40, the ECU 2 calculates the target cam phase VTCCMD using the following equation (1) by adding the water temperature correcting value VTCCMDTW and the vehicle speed correcting value VTCCMDV, found at steps 36, 37 or at steps 39, 40, to the basic value VTCCMDMAP found at step 35 or 38:

$$VTCCMD = VTCCMDMAP + VTCCMDTW + VTCCMDV \qquad (1)$$

Next, after the previously calculated cam phase deviation DVTC is stored as its preceding value DVTC1 (step 42), the ECU 2 calculates a deviation between the target cam phase VTCCMD calculated at step 41 and a detected actual cam phase (actual cam phase) VTCACT (VTCCMD-VTCACT) as a current cam phase deviation DVTC (step 43). Next, the ECU 2 calculates a P-term gain KP, an I-term gain KI and a D-term gain KD for the PID feedback control in accordance with the engine rotational speed NE (step 44). Though not shown, these gains are set to larger values as the engine rotational speed NE is higher in order to provide a larger control amount.

Next, the ECU 2 calculates P-term DbVTCP, I-term DbVTCI and D-term DbVTCD using the foregoing gains by the following respective equations (step 45):

$$DbVTCP = DVTC*KP$$

$$DbVTCI = DbVTCI + DVTC*KI$$

$$DbVTCD = DK*(DVTC - DVTC1)$$

Next, the ECU 2 calculates the duty ratio DbVTC by adding the calculated P-term DbVTCP, I-term DbVTCI and D-term DbVTCD (step 46).

Next, at steps 47–47, the ECU 2 imposes limits to the I-term DbVTCI and the duty ratio DbVTC. Specifically, the ECU 2 determines whether or not the I-term DbVTCI is larger than its upper limit value DbVTCIHL (step 47), and sets the I-term DbVTCI and the duty ratio DbVTCI respectively to the upper limit value DbVTCIHL when DbVTCI>DbVTCIHL (steps 48, 49), followed by termination of this subroutine. On the other hand, if the answer at step 47 is NO, i.e., when DbVTCI≦DbVTCIHL, ECU 2 skips steps 48, 49 to hold the I-term DbVTCI and the duty ratio DbVTCI, followed by termination of this subroutine.

In the foregoing manner, the VTC control determines the basic value VTCCMDMAP for the target cam phase in accordance with the engine rotational speed NE and the required torque PMCMD using the VTCCMDH map shown in FIG. 5. As described above, the required torque PMCMD is determined based on the engine rotational speed NE and the accelerator pedal opening AP. Therefore, the target cam phase VTCCMD can be appropriately set in accordance with a particular load, without affected by the throttle valve opening TH, absolute intake pipe inner pressure PBA, amount of intake pair, even in the stratified combustion mode in which the throttle valve 13 is controlled to remain in a fully open state. As a result, the filling efficiency and internal EGR are appropriately controlled, thereby making it possible to provide required engine power and improve the exhaust gas characteristic. Also, since the basic value VTCCMDMAP for the target cam phase is corrected using the water temperature correcting value VTCCMDTW and the vehicle speed correcting value VTCCMDV, more proper engine power can be provided while compensating for a deviation of the filling efficiency. Furthermore, the target cam phase VTCCMD is separately set for LO.VT and for HI.VT, so that yet more proper engine power can be provided.

Figure 8:
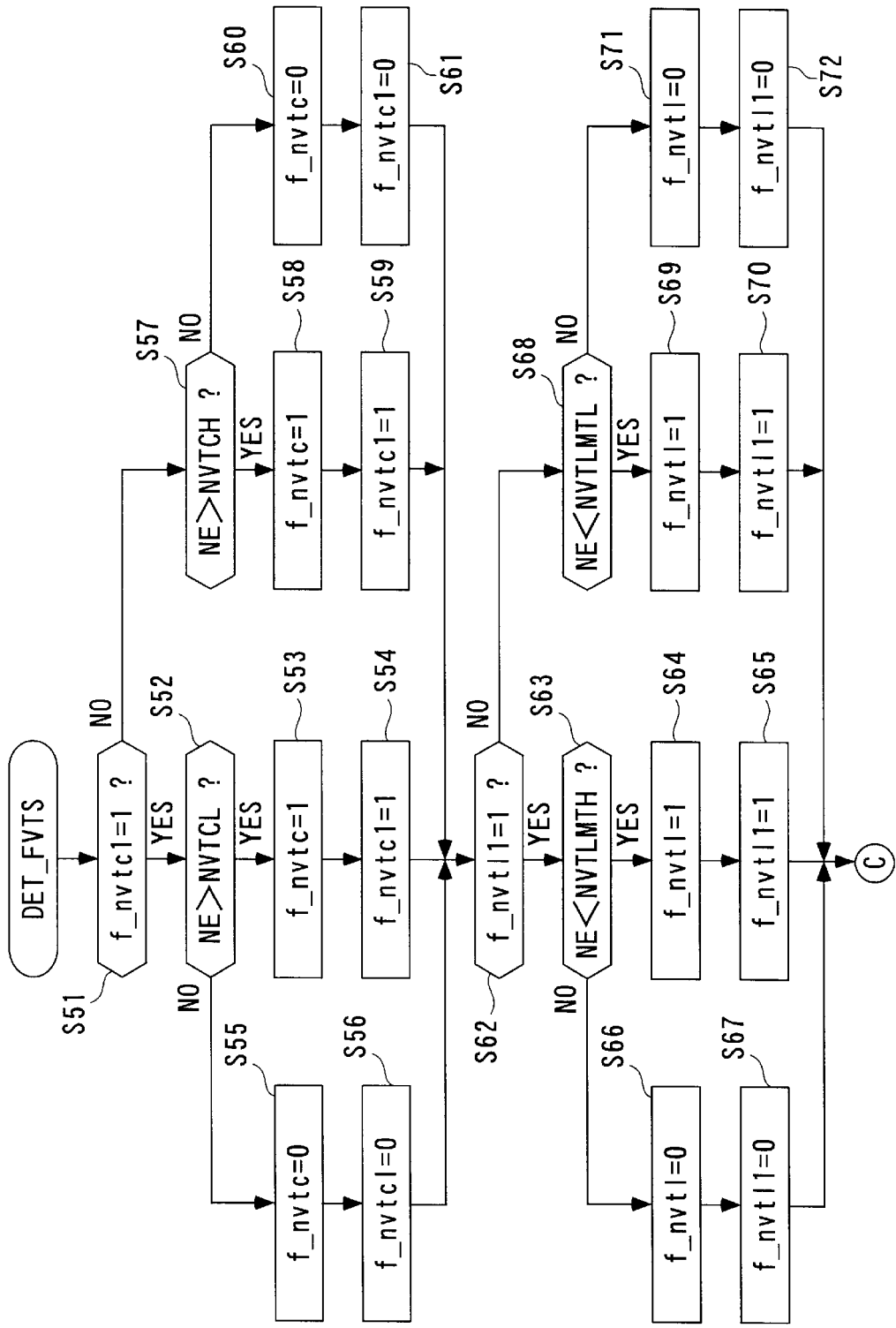
FIGS. 8 and 9 are flow charts illustrating in combination a subroutine for determining a valve timing.
Figure 9:
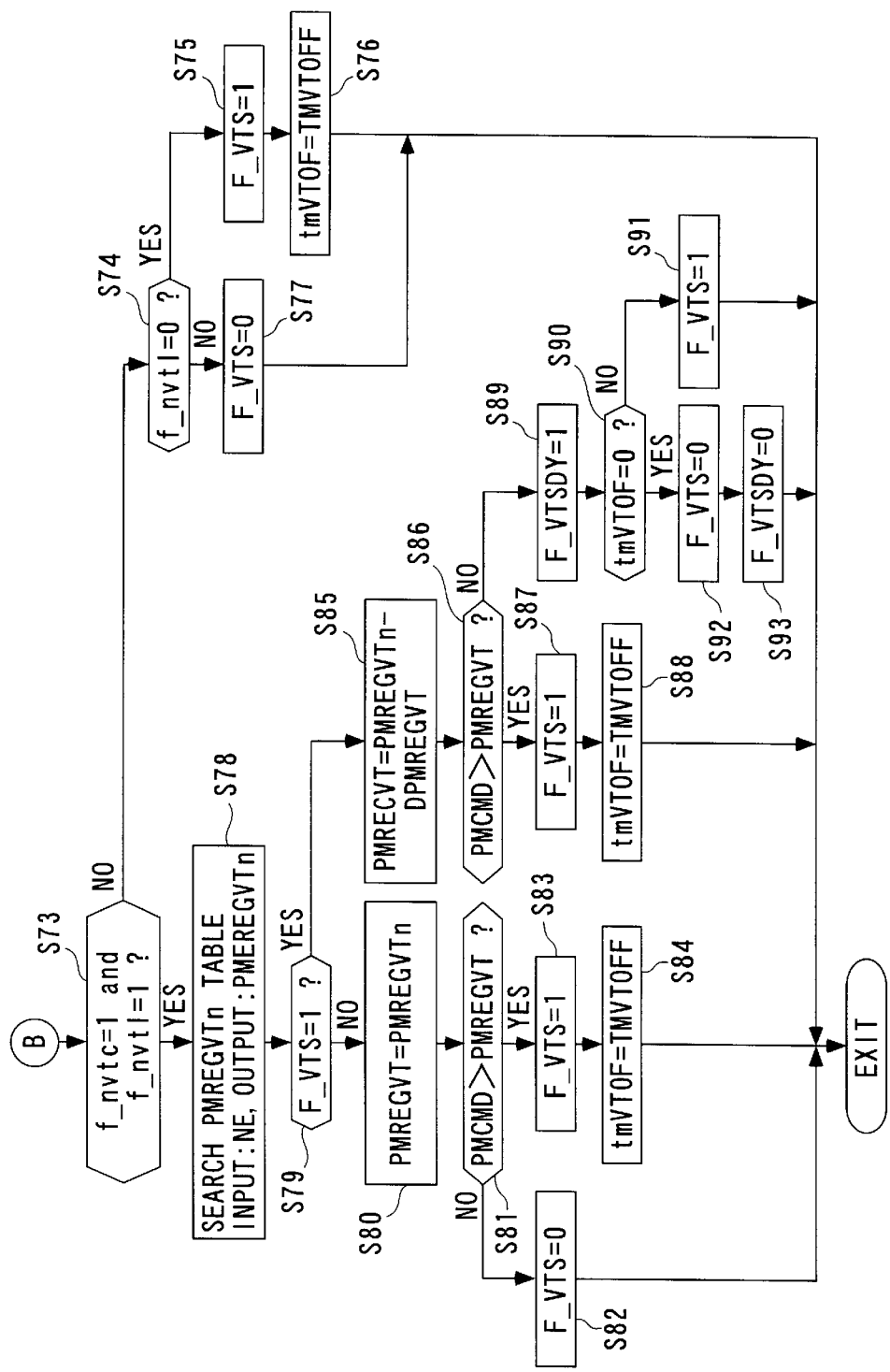

FIGS. 8 and 9 illustrate a subroutine for determining the valve timing in the VTEC control, specifically, for determining whether the valve timing is set to LO.VT or HI.VT. The processing involved in this subroutine and valve timing switching, later described, are executed in synchronism with the generation of a TDC signal.

In the illustrated subroutine, the ECU 2 first determines at steps 51–61 whether or not the engine rotational speed NE is in a range in which HI.VT can be executed. Specifically, the ECU 2 determines whether or not the preceding value f_nvtcl of an HI.VT rotational speed flag is "1" (step 51). If the answer at step 51 is YES, i.e., when the engine rotational speed NE has been in the HI.VT executable region in the preceding loop, the ECU 2 determines whether or not the engine rotational speed NE is higher than a first limit value NVTCL (for example, 2100 rpm) (step 52). If the answer is YES (NE>NVTCL), assuming that the engine rotational speed NE is in the HI.VT executable region, the ECU 2 sets both the HI.VT rotational speed flag f_nvtc and its preceding value f_nvtc1 to "1" to indicate to that effect (steps 53, 54). On the other hand, if the answer at step 52 is NO (NENVTCL), assuming that the engine rotational speed NE is not in the HI.VT executable region, the ECU 2 sets both the HI.VT rotational speed flag f_nvtc and its preceding value f_nvtc1 to "0" (steps 55, 56).

On the other hand, if the answer at step 51 is NO, i.e., when the engine rotational speed NE was not in the HI.VT executable region in the preceding loop, the ECU 2 determines whether or not the engine rotation speed NE is larger than a second limit value NVTCH (for example, 2250 rpm) which is larger by additional predetermined hysteresis than the first limit value NVTCL (step 57). If the answer is YES (NE>NVTCH), assuming that the engine rotational speed NE is in the HI.VT executable region, the ECU 2 sets both the f_nvtc value and the f_nvtc1 value to "1" (steps 58, 59), similarly to the aforementioned steps 53, 54. On the other hand, if the answer is NO (NE≦NVTCH), assuming that the engine rotational speed NE is not in the HI.VT executable region, the ECU 2 sets both the f_nvtc value and the f_nvtc1 value to "0" (steps 60, 61), similarly to the aforementioned steps 55, 56. In this way, the hysteresis is provided between the first and second limit values NVTCL, NVTCH to prevent control hunting.

Next, at steps 62–72, the ECU 2 determines whether or not the engine rotational speed NE is in an LO.VT executable range, similarly to the aforementioned steps 51–61. Specifically, the ECU 2 first determines whether or not the preceding value f_nvtl11 of an LO.VT rotational speed flag f_nvtl1 is "1" (step 62). If the answer at step 62 is YES, i.e., when the engine rotational speed NE has been in the LO.VT executable range in the preceding loop, the ECU 2 determines whether or not the engine rotational speed NE is lower than a third limit value NVTLMTH (for example, 3500 rpm) which is larger than the first limit value NVTCL (step 63). If the answer at step 63 is YES (NE<NVTLMTH), assuming that the engine rotational speed is in the LO.VT executable region, the ECU 2 sets both the LO.VT rotational speed flag f_nvtl1 and its preceding value f_nvtl11 to "1" (steps 64, 65). On the other hand, if the answer at step 63 is NO (NE≧NVTLMTH), assuming that the engine rotational speed NE is not in the LO.VT executable range, the ECU 2 sets both the f_nvtl1 value and the f_nvtl11 value to "0" (steps 66, 67).

On the other hand, if the answer at step 62 is NO, i.e., when the engine rotational speed NE was not in the LO.VT executable range during the preceding loop, the ECU 2 determines whether or not the engine rotational speed NE is lower than a fourth limit value NVTLMTL (for example, 3650 rpm) which is smaller by predetermined hysteresis than the third limit value NVTLMTH (step 68). Similarly to the aforementioned hysteresis, the hysteresis between the third and fourth limit values NVTLMTH, NVTLMTL is provided for preventing the control hunting. If the answer at step 68 is YES (NE<NVTLMTL), assuming that the engine rotational speed NE is in the LO.VT executable region, the ECU 2 sets both the f_nvtl1 value and the f_nvtl11 value to "1" (steps 69, 70). On the other hand, if NO (NE≧NVTLMTL), assuming that the engine rotational speed NE is not in the LO.VT executable range, the ECU 2 sets both the f_nvtl1 value and the f_nvtl11 value to "0" (steps 71, 72).

Next, the subroutine proceeds to step 73, where the ECU 2 determines whether or not the HI.VT and LO.VT rotational speed flags f_nvtc, f_nvtl1 are both "1." If the answer is NO, the ECU 2 further determines whether or not the LO.VT rotational speed flag f_nvtl1 is "0" (step 74). Conversely, if the answer is YES, i.e., when f_nvtc=1 and f_nvtl1=0, and the engine rotational speed NE is in the HI.VT executable range but not in the LO.VT executable range, the ECU 2 determines that the valve timing should be set to HI.VT, and sets an HI.VT enable flag F_VTS to "1" to indicate to that effect (step 75). Next, the ECU 2 sets a timer value tmVTO of an LO.VT enable delay timer which is a down count timer, later described, to a predetermined value TMVTOFF (for example, corresponding to 50 ms) (step 76), followed by termination of this subroutine.

On the other hand, if the answer at step 74 is NO, i.e., when f_nvtc=0 and f_nvtl1=1, and the engine rotational speed Ne is not in the HI.VT executable region but in the LO.VT executable range, the ECU 2 determines that the valve timing should be set to LO.VT, and sets the HI.VT enable flag F_VTS to "0" to indicate to that effect (step 77), followed by termination of this subroutine.

On the other hand, if the answer at step 73 is YES, i.e., when f_nvtc=1 and f_nvtl1=1, and the engine rotational speed NE is in both the HI.VT and LO.VT executable regions, the ECU 2 searches a PMREGVTn table in accordance with the engine rotational speed NE to find a threshold value PMREGVTn for the required torque (step 78). FIG. 10 shows an example of the PMREGVTn table, wherein the threshold value PMREGVTn is set to a smaller value as the engine rotational speed NE is higher. Specifically, the threshold value PMREGVTn is set to a first predetermined value PMREGVT1 when the engine rotational speed NE is equal to or lower than a first rotational speed NE1 (for example, 2100 rpm); to a second predetermined value PMREGVT2 (<PMREGVT1) when the engine rotational speed NE is between a second and a third rotational speed NE2, NE3 (for example, 2300, 2500 rpm), higher than the first rotational speed NE1; and to a third predetermined value PMREGVT3 (<PMREGVT2) when the engine rotational speed NE is equal to or higher than a fourth rotational speed NE4 (for example, 3000 rpm) higher than the third rotational speed NE3, respectively. Between the first and second rotational speeds NE1, NE2, and between the third and fourth rotational speeds NE3, NE4, the threshold value PMREGVTn is calculated through an interpolation. DPMREGVT in FIG. 10 indicates a hysteresis term, later described.

Next, the ECU 2 determines whether or not the HI.VT enable flag F_VTS is "1" (step 79). If the answer is NO, i.e., when the ECU 2 determines that the valve timing should be set to LO.VT, the ECU 2 sets the threshold value PMREGVT for the required torque to the value PMREGVTn which has been found at step 78 (step 80). Next, the ECU 2 determines whether or not the required torque PMCMD is larger than the threshold value PMREGVT (step 81). If the answer is NO, i.e., when the required torque PMCMD is equal to or less than the threshold value PMREGVT, the ECU 2 determines that the valve timing should be still set to LO.VT, and holds the HI.VT enable flag F_VTS to "0" (step 82), followed by termination of this subroutine.

If the answer at step 81 is YES, i.e., when the required torque PMCMD exceeds the threshold value PMREGVT, the ECU 2 determines that the valve timing should be switched to HI.VT, and sets the HI.VT enable flag F_VTS to "1" (step 83). Next, the ECU 2 sets a timer value tmVTOF of the LO.VT enable delay timer to a predetermined value TMVTOFF (step 84), followed by termination of this subroutine.

On the other hand, if the answer at step 79 is YES, i.e., when the ECU 2 determines that the valve timing should be set to HI.VT, the ECU 2 sets the threshold value PMREGVT for the required torque to a value (on the lower line in FIG. 10) calculated by subtracting the hysteresis term DPMREGVT from the value PMREGVTn found at step 78 (step 85). Next, similarly to the aforementioned step 81, the ECU 2 determines whether or not the required torque PMCMD is larger than the threshold value PMREGVT (step 86). If the answer is YES, i.e., when the required torque PMCMD exceeds the threshold value PMREGVT, the ECU 2 determines that the valve timing should be still set to HI.VT, and holds the HI.VT enable flag F_VTS at "1" (step 87), and, similarly to the aforementioned step 84, sets the timer value tmVTOF of the LO.VT enable delay timer to the predetermined value TMVTOFF (step 88), followed by termination of this subroutine.

On the other hand, if the answer at step 86 is NO, i.e., when the required torque PMCMD is equal to or less than the threshold value PMREGVT, the ECU 2 sets an LO.VT enable delay flag F_VTSDY to "1" (step 89), and determines whether or not the timer value tmVTOF of the LO.VT enable delay timer is "0" (step 90). If the answer is NO, i.e., when a predetermined time has not been elapsed after the required torque PMCMD was reduced below the threshold value PMREGVT, when the ECU 2 has determined that the valve timing should be set to HI.VT, the ECU 2 determines that the valve timing should be still set to HI.VT and holds the HI.VT enable flag F_VTS at "1" (step 91).

On the other hand, if the answer at step 90 is YES, i.e., when the state of the required torque PMDMD equal to or less than the threshold value PMREGVT has continued for a predetermined time with tmVTOF=0, the ECU 2 determines that the valve timing should be switched to LO.VT, and sets the HI.VT enable flag F_VTS to "0" (step 92). Next, the ECU 2 sets the LO.VT enable delay flag F_VTSDY to "0" (step 93), followed by termination of this subroutine.

In the foregoing manner, in the determination of the valve timing for the VTEC control, the switching between LO.VT and HI.VT is also determined with the engine rotational speed NE and the required torque PMCMD used as parameters, as is the case with the VTC control, thereby making it possible to appropriately provide required engine power in accordance with a particular load, in cooperation with the VTC control, without affected by the absolute intake pipe inner pressure PBA, even in the stratified combustion mode. In addition, by providing the hysteresis in the threshold value PMREGVT for the required torque PMCMD, it is possible to prevent the switching hunting between LO.VT and HI.VT.

Figure 11:
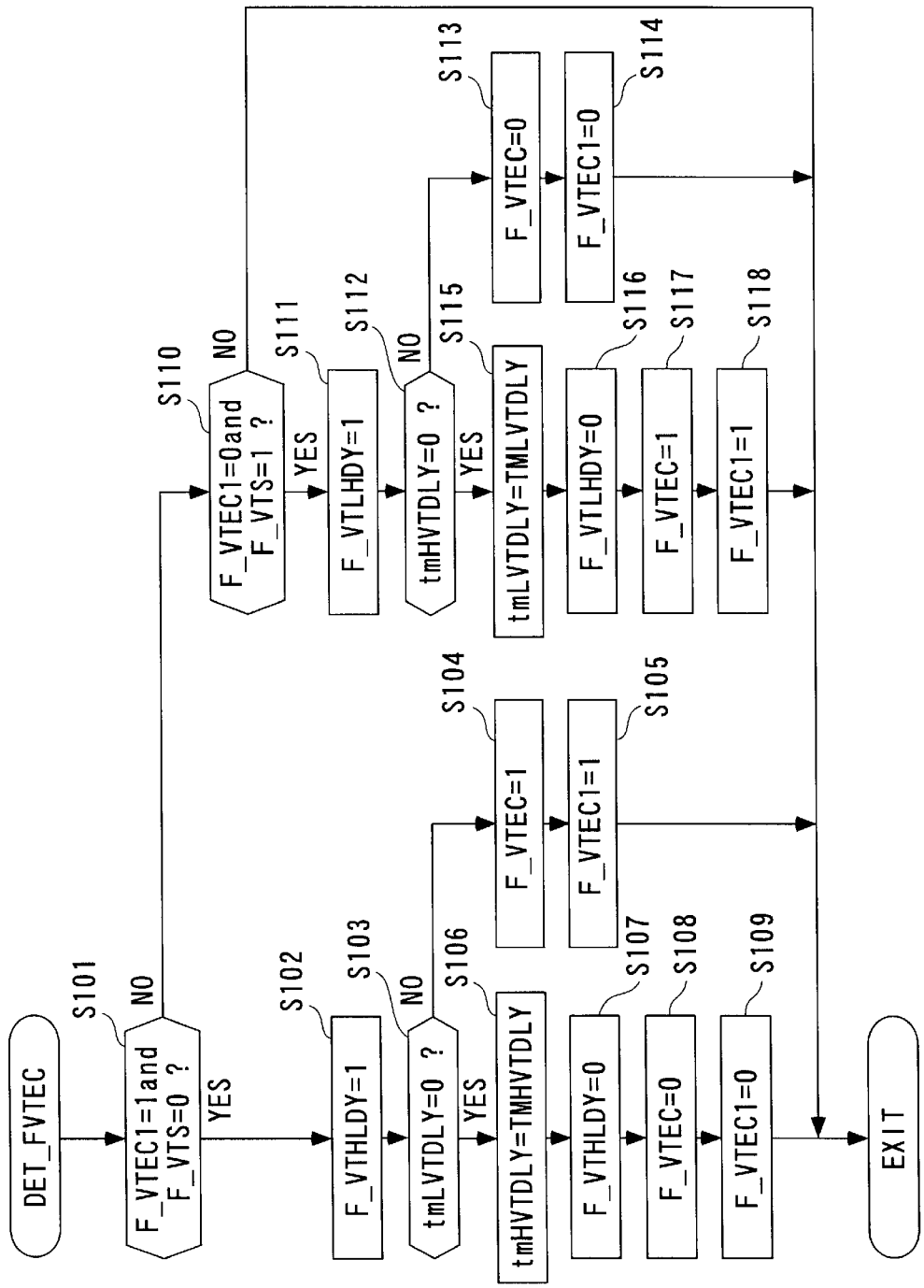
FIG. 11 is a flow chart illustrating a subroutine for switching the valve timing.

FIG. 11 illustrates a subroutine for actually switching the valve timing to LO.VT or HI.VT in accordance with the results of the determinations in FIGS. 9 and 10.

First in the illustrated subroutine, the ECU 2 determines at step 101 whether or not the preceding value F_VTEC1 of the VTEC execution flag is "1" and the HI.VT enable flag F_VTS is "0." If the answer is YES, i.e., when the ECU 2 determines that the valve timing should be set to LO.VT during the execution of HI.VT, the ECU 2 sets an LO.VT execution delay flag F_VTHLDY to "1" (step 102), and determines whether or not a timer value tmLVTDLY of an LO.VT execution delay timer is zero (step 103). The LO.VT execution delay timer tmLVTDLY is a down count timer which is set at a predetermined value TMLVTDLY (for example, corresponding to 50 ms) at step 115, later described. If the answer at step 103 is NO, i.e., when a predetermined time has not been elapsed after the ECU 2 determined that the valve timing should be set to LO.VT during the execution of HI.VT, the ECU 2 sets both the VTEC execution flag F_VTEC and its preceding value F_VTEC1 to "1" (steps 104, 105), and continuously executes HI.VT, followed by termination of this subroutine.

On the other hand, if the answer at step 103 is YES, i.e., when the determination that the valve timing should be set to LO.VT during the execution of HI.VT has continued for a predetermined time with lmLVTDLY=0, the ECU 2 sets a timer value tmHVTDLY of an HI.VT execution delay timer, later described, to a predetermined value TMHVTDLY (for example, corresponding to 50 ms) (step 106), sets the LO.VT execution delay flag F_VTHLDY to "0" (step 107), sets both the VTEC execution flag F_VTEC and its preceding value F_VTEC1 to "0" (steps 108, 109), and switches the valve timing to LO.VT, followed by termination of this subroutine.

On the other hand, if the answer at step 101 is NO, the subroutine proceeds to step 110, where the ECU 2 determines whether or not the preceding value F_VTEC1 of the VTEC execution flag is "0" and the HI.VT enable flag F_VTS is "1," contrary to the determination at step 101. If the answer at step 110 is YES, i.e., when the ECU 2 determines that the valve timing should be set to HI.VT during the execution of LO.VT, the ECU 2 switches the valve timing from LO.VT to HI.VT at steps 111–118, similarly to the aforementioned steps 102–109. Specifically, the ECU 2 sets the HI.VT execution delay flag F_VTLHDY to "1" (step 111), and determines whether or not the timer value tmHVTDLY of the HI.VT execution delay timer set at step 106 is zero (step 112). If the answer is NO, i.e., when a predetermined time has not been elapsed after the ECU 2 determined that the valve timing should be set to HI.VT during the execution of LO.VT, the ECU 2 sets both the VTEC execution flag F_VTEC and its preceding value F_VTEC1 to "0" (steps 113, 114), and continuously executes LO.VT, followed by termination of this subroutine.

On the other hand, if the answer at step 112 is YES, i.e., when the determination that the valve timing should be set to HI.VT during the execution of LO.VT has continued for a predetermined time, the ECU 2 sets the timer value tmLVTDLY of the LO.VT execution delay timer to a predetermined value TMLVTDLY (step 115), sets the HI.VT execution delay flag F_VTLHDY to "0" (step 116), sets both the VTEC execution flag F_VTEC and its preceding value F_VTEC1 to "1" (steps 117, 118), and switches the valve timing to HI.VT, followed by termination of this subroutine.

On the other hand, if the answer at step 110 is NO, i.e., when the ECU 2 does not determine that during the execution of one of LO.VT and HI.VT, the valve timing should be set from the one to the other, this subroutine is terminated without further processing, to hold the valve timing under execution.

As described above, in the valve timing control subroutine illustrated in FIG. 11, when the ECU 2 determines that during the execution of one of LO.VT and HI.VT, the valve timing should be switched from the one to the other, the valve timing is switched by means of the HI.VT and LO.VT execution delay timers tmHVTDLY, tmLVTDLY after the state at the time of the determination lasts for a predetermined time. In this way, the VTEC 11 can be stably actuated while preventing frequent switching of the valve timing.

Thus, according to the present invention, the basic value VTCCMDMAP for the target cam phase is determined in accordance with the engine rotational speed NE and the required torque PMCMD, so that the engine power can be appropriately set in accordance with a particular load, without affected by the throttle valve opening TH, absolute intake pipe inner pressure PBA, amount of intake air, and so on, even in the stratified combustion mode in which the throttle value 13 is controlled to remain in a fully open state. As a result, the filling efficiency and internal EGR are appropriately controlled, thereby making it possible to ensure required engine power and improve the exhaust gas characteristic. Also, since the basic value VTCCMDMAP for the target cam phase is corrected using the water temperature correcting value VTCCMDTW and the vehicle speed correcting value VTCCMDV, more proper engine power can be provided while compensating for a deviation of the filling efficiency.

Further, for determining the valve timing for the VTC control, the switching of the valve timing between LO.VT and HI.VT is determined with the engine rotational speed NE and the required torque PMCMD used as parameters, as is the case with the VTC control, so that the switching can be appropriately performed in accordance with a particular load, without affected by the absolute intake pipe inner pressure PBA and so on, even in the stratified combustion mode, thereby making it possible to appropriately ensure required engine power in cooperation with the VTC control.

It should be understood that the present invention is not limited to the foregoing embodiment, but may be implemented in a variety of manners. For example, while the foregoing embodiment has shown an example in which the present invention is applied to an internal combustion engine which has both VTC 10 and VTEC 11, the present invention can of course be applied to an internal combustion engine which has only one of them. Also, while the valve timing determination for the VTEC control in the foregoing embodiment does not particularly consider the engine water temperature TW and the vehicle speed V in determining the switching between LO.VT and HI.VT, it is possible to correct the threshold value PMREGVT for the required torque PMCMD, for example, using the engine water temperature TW and/or the vehicle speed V.

As will be appreciated, the valve timing controller for an internal combustion engine according to the present invention can be used in a direct injection type internal combustion engine to set the valve timing in accordance with a load on the engine even in the stratified combustion mode.

What is claimed is:

1. A valve timing controller for an internal combustion engine having a valve timing changing mechanism for changing a valve timing of at least one of an intake valve and an exhaust valve so that said engine is operated in a combustion mode switched between a uniform combustion mode in which a fuel is injected into a cylinder during an intake stroke and a stratified combustion mode in which a fuel is injected into a cylinder in a compression stroke, said valve timing controller comprising:

engine rotational speed detecting means for detecting a rotational speed of said internal combustion engine;

accelerator pedal opening detecting means for detecting an opening of an accelerator pedal;

required torque determining means for determining a required torque outputted by said internal combustion engine based on the detected engine rotational speed and accelerator pedal opening;

valve timing determining means for determining said valve timing in accordance with the determined required torque and the engine rotational speed;

filling efficiency parameter detecting means for detecting a filling efficiency parameter indicative of a filling efficiency of intake air flowing into said cylinder; and valve timing correcting means for correcting said valve timing in accordance with the detected filling efficiency parameter.

2. A valve timing controller for an internal combustion engine according to claim 1, wherein:

said valve timing changing mechanism includes a cam phase changing mechanism for changing a cam phase, with respect to a crank shaft, of at least one of an intake cam for opening and closing said intake valve and an exhaust cam for opening and closing said exhaust valve; and said valve timing determining means includes target cam phase determining means for determining a target cam phase for said cam phase in accordance with the required torque and the engine rotational speed.

3. A valve timing controller for an internal combustion engine according to claim 1, wherein:

said valve timing changing mechanism includes a cam profile switching mechanism for switching at least one of an intake cam for opening and closing said intake valve and an exhaust cam for opening and closing said exhaust valve to one of a plurality of cams having different cam profiles from each other; and said valve timing determining means includes cam profile switching means for switching said cam profile in accordance with the required torque and the engine rotational speed.

4. A valve timing controller for an internal combustion engine according to claim 1, wherein said filling efficiency parameter is at least one of the temperature of said internal combustion engine and the speed of a vehicle which carries said internal combustion engine.

5. A valve timing controller for an internal combustion engine according to any of claims 1 to 4, wherein said engine includes a fuel injection valve for injecting the fuel, said fuel injection valve being disposed in a central portion of a top wall of a combustion chamber of said cylinder for injecting the fuel toward a recess formed in a piston.

6. A valve timing controller for an internal combustion engine having a valve timing changing mechanism for changing a valve timing of at least one of an intake valve and an exhaust valve so that said engine is operated in a combustion mode switched between a uniform combustion mode in which a fuel is injected into a cylinder during an intake stroke and a stratified combustion mode in which a fuel is injected into a cylinder in a compression stroke, said valve timing controller comprising:

an engine rotational speed detecting module for detecting a rotational speed of said internal combustion engine;

an accelerator pedal opening detecting module for detecting an opening of an accelerator pedal;

a required torque determining module for determining a required torque outputted by said internal combustion engine based on the detected engine rotational speed and accelerator pedal opening;

a valve timing determining module for determining said valve timing in accordance with the determined required torque and the engine rotational speed;

a filling efficiency parameter detecting module for detecting a filling efficiency parameter indicative of a filling efficiency of intake air flowing into said cylinder; and a valve timing module for correcting said valve timing in accordance with the detected filling efficiency parameter.

7. A valve timing controller for an internal combustion engine according to claim 6, wherein:

said valve timing changing mechanism includes a cam phase changing mechanism for changing a cam phase, with respect to a crank shaft, of at least one of an intake cam for opening and closing said intake valve and an exhaust cam for opening and closing said exhaust valve; and said valve timing determining module includes a target cam phase determining module for determining a target cam phase for said cam phase in accordance with the required torque and the engine rotational speed.

8. A valve timing controller for an internal combustion engine according to claim 6, wherein:
- said valve timing changing mechanism includes a cam profile switching mechanism for switching at least one of an intake cam for opening and closing said intake valve and an exhaust cam for opening and closing said exhaust valve to one of a plurality of cams having different cam profiles from each other; and
- said valve timing determining module includes a cam profile switching module for switching said cam profile in accordance with the required torque and the engine rotational speed.

9. A valve timing controller for an internal combustion engine according to claim 6, wherein
- said filling efficiency parameter is at least one of the temperature of said internal combustion engine and the speed of a vehicle which carries said internal combustion engine.

10. A valve timing controller for an internal combustion engine according to any of claims 6 to 9, wherein said engine includes a fuel injection valve for injecting the fuel, said fuel injection valve being disposed in a central portion of a top wall of a combustion chamber of said cylinder for injecting the fuel toward a recess formed in a piston.

11. A valve timing control method for an internal combustion engine having a valve timing changing mechanism for changing a valve timing of at least one of an intake valve and an exhaust valve so that said engine is operated in a combustion mode switched between a uniform combustion mode in which a fuel is injected into a cylinder during an intake stroke and a stratified combustion mode in which a fuel is injected into a cylinder in a compression stroke, said valve timing control method comprising the steps of:
- detecting a rotational speed of said internal combustion engine;
- detecting an opening of an accelerator pedal;
- determining a required torque outputted by said internal combustion engine based on the detected engine rotational speed and accelerator pedal opening;
- determining said valve timing in accordance with the determined required torque and the engine rotational speed;
- detecting a filling efficiency parameter indicative of a filling efficiency of intake air flowing into said cylinder; and
- correcting said valve timing in accordance with the detected filling efficiency parameter.

12. A valve timing control method for an internal combustion engine according to claim 11, wherein:
- said valve timing changing mechanism includes a cam phase changing mechanism for changing a cam phase, with respect to a crank shaft, of at least one of an intake cam for opening and closing said intake valve and an exhaust cam for opening and closing said exhaust valve, and
- said step of changing a valve timing includes changing a cam phase, with respect to a crank shaft, of at least one of an intake cam for opening and closing said intake valve and an exhaust cam for opening and closing said exhaust valve; and
- said step of determining said valve includes determining a target cam phase for said cam phase in accordance with the required torque and the engine rotational speed.

13. A valve timing control method for an internal combustion engine according to claim 11, wherein:
- said valve timing changing mechanism includes a cam profile switching mechanism for switching at least one of an intake cam for opening and closing said intake valve and an exhaust cam for opening and closing said exhaust valve to one of a plurality of cams having different cam profiles from each other; and
- said step of determining said valve timing includes switching said cam profile in accordance with the required torque and the engine rotational speed.

14. A valve timing control method for an internal combustion engine according to claim 11, wherein said filling efficiency parameter is at least one of a temperature of said internal combustion engine and a speed of a vehicle equipped with said internal combustion engine.

15. A valve timing control method for an internal combustion engine according to any of claims 11 to 14, wherein said engine includes a fuel injection valve for injecting the fuel, said fuel injection valve being disposed in a central portion of a top wall of a combustion chamber of said cylinder for injecting the fuel toward a recess formed in a piston.

16. An engine control unit including a control program for causing a computer to carry out control of valve timing for an internal combustion engine having a valve timing changing mechanism for changing a valve timing of at least one of an intake valve and an exhaust valve so that said engine is operated in a combustion mode switched between a uniform combustion mode in which a fuel is injected into a cylinder during an intake stroke and a stratified combustion mode in which a fuel is injected into a cylinder in a compression stroke, wherein said control program causes said computer to detect a rotational speed of said internal combustion engine; detect an opening of an accelerator pedal; determine a required torque outputted by said internal combustion engine based on the detected engine rotational speed and accelerator pedal opening; determine said valve timing in accordance with the determined required torque and the engine rotational speed; detect a filling efficiency parameter indicative of a filling efficiency of intake air flowing into said cylinder; and correct said valve timing in accordance with the detected filling efficiency parameter.

17. An engine control unit according to claim 16, wherein:
- said valve timing changing mechanism includes a cam phase changing mechanism for changing a cam phase, with respect to a crank shaft, of at least one of an intake cam for opening and closing said intake valve and an exhaust cam for opening and closing said exhaust valve, and
- when said control program causes said computer to determine said valve timing, said control program causes said computer to determine a target cam phase for said cam phase in accordance with the required torque and the engine rotational speed.

18. An engine control unit according to claim 16, wherein:
- said valve timing changing mechanism includes a cam profile switching mechanism for switching at least one of an intake cam for opening and closing said intake valve and an exhaust cam for opening and closing said exhaust valve to one of a plurality of cams having different cam profiles from each other, and
- when said control program causes said computer to determine said valve timing, said control program causes said computer to switch said cam profile in accordance with the required torque and the engine rotational speed.

19. An engine control unit according to claim 16, wherein said filling efficiency parameter is at least one of a temperature of said internal combustion engine and a speed of a vehicle equipped with said internal combustion engine.

20. An engine control unit according to any of claims 16 to 19, wherein said engine includes a fuel injection valve for injecting the fuel, said fuel injection valve being disposed in a central portion of a top wall of a combustion chamber of said cylinder for injecting the fuel toward a recess formed in a piston.

21. A valve timing controller for an internal combustion engine having a valve timing changing mechanism for changing a valve timing of at least one of an intake valve and an exhaust valve so that said engine is operated while switching a combustion mode thereof between a uniform combustion mode in which a fuel is injected into a cylinder during an intake stroke, a stratified combustion mode in which a fuel is injected into a cylinder in a compression stroke, and a dual injection combustion mode during transition between the uniform combustion mode and the stratified combustion mode, said valve timing controller comprising:

engine rotational speed detecting means for detecting a rotational speed of said internal combustion engine;

accelerator pedal opening detecting means for detecting an opening of an accelerator pedal;

required torque determining means for determining a required torque outputted by said internal combustion engine based on the detected engine rotational speed and accelerator pedal opening; and valve timing determining means for determining said valve timing in accordance with the determined required torque and the engine rotational speed at least when said engine is operated in the dual injection combustion mode.

* * * * *